United States Patent [19]

Cariou et al.

[11] Patent Number: 5,724,649
[45] Date of Patent: Mar. 3, 1998

[54] VOLTAGE REGULATION CIRCUIT FOR A RADIO WITH PLURAL RECEIVERS

[75] Inventors: Laurent Cariou, Meylan; Bertrand Debever, La Terasse, both of France

[73] Assignee: Atral, Crolles, France

[21] Appl. No.: 495,788

[22] Filed: Jun. 27, 1995

[30] Foreign Application Priority Data

Jun. 29, 1994 [FR] France ..................... 94 08020

[51] Int. Cl.$^6$ ..................................... H04B 1/16
[52] U.S. Cl. ..................... 455/132; 455/343; 455/572
[58] Field of Search ........................... 455/132, 343, 455/9, 53.1, 553, 552, 572, 574, 127; 340/636; 307/36, 38, 39

[56] References Cited

U.S. PATENT DOCUMENTS

| | | | |
|---|---|---|---|
| 3,458,711 | 7/1969 | Calkin et al. | 307/36 |
| 3,743,924 | 7/1973 | Genuit et al. | 307/39 |
| 4,823,398 | 4/1989 | Hashimoto | 455/343 |
| 5,291,519 | 3/1994 | Tsurumaru | 455/133 |
| 5,392,457 | 2/1995 | Davis et al. | 455/343 |
| 5,392,462 | 2/1995 | Komaki | 455/343 |
| 5,436,511 | 7/1995 | Nigawara et al. | 307/39 |

FOREIGN PATENT DOCUMENTS 227458  1/1987  European Pat. Off. .
680824  11/1992  Switzerland .

OTHER PUBLICATIONS

European Search Report.

*Primary Examiner*—Reinhard J. Eisenzopf
*Assistant Examiner*—Lester G. Kincaid
*Attorney, Agent, or Firm*—Beveridge, DeGrandi, Weilacher & Young, LLP

[57] ABSTRACT

Device for receiving signals, in particular radio signals, on at least two channels characterized by different carrier frequencies for each of the channels, comprising at least two receivers responsive to respective carrier frequencies and connected to a direct current electrical power supplied between at least two respective terminals. The two receivers (2, 3) are disposed in series between the two poles of a common direct current electrical power supply (13) so that one terminal of one of said receivers is connected to one pole of the power supply, one terminal of the other receiver is connected to the other pole of the power supply and their other terminals are connected together. In one embodiment, a first voltage regulator (16) regulates the voltage at the terminals of the receivers in series and a second voltage regulator (17) regulates the voltage of one of the receivers (3).

11 Claims, 3 Drawing Sheets

5,724,649

VOLTAGE REGULATION CIRCUIT FOR A RADIO WITH PLURAL RECEIVERS

BACKGROUND OF THE INVENTION

The present invention concerns an improvement to devices for receiving signals, especially radio signals, on at least two channels with different carrier frequencies for each channel, the device preferably comprising at least two receivers responsive to respective carrier frequencies and connected to a direct current electrical power supply between at least two respective terminals.

SUMMARY OF THE INVENTION

One object of the present invention is to propose a receiver device with low electrical power consumption.

Another object of the present invention is to propose a receiver device increasing the chances of receiving signals even if the electrical energy available in the power supply of the receivers is weakened, as is the case with a power supply by means of cells or batteries.

In one particular application, the receiver device of the invention can advantageously be used in transmission systems powered by cells such as self-contained remote control systems and alarm systems for protection of persons and property in which information is transmitted between different self-contained modules or devices of the system by radio on two independent transmission channels at different carrier frequencies, these devices or modules being powered by cells or batteries.

In accordance with one aspect of the invention, said two receivers are connected in series between the two poles of a common direct current electrical power supply so that one terminal of one of said receivers is connected to one pole of the power supply, one terminal of the other receiver is connected to the other pole of the power supply and their other terminals are connected together. Accordingly, the current flowing through one receiver flows entirely or partly through the other receiver.

In accordance with the invention, the supply voltage can advantageously be divided between the two series-connected receivers by means of a voltage divider bridge.

In accordance with the invention, the receiver device can advantageously comprise means for controlling the voltage at said common terminals of said receivers.

In accordance with another aspect of the invention, the receiver device preferably comprises a first voltage regulator adapted to regulate to a first predetermined value the voltage between said terminals of said receivers connected to the poles of the power supply and a second voltage regulator adapted to regulate to a second predetermined value the voltage between said common terminal of said receivers and the terminal of the receiver connected to the lowest potential pole of the power supply, said first predetermined value being higher than said second predetermined value.

In accordance with the invention, said second voltage regulator can be connected directly to the pole of the power supply on the input side of said first regulator.

In a different embodiment of the invention said second regulator can be connected to the power supply through said first regulator.

In accordance with the invention, the receiver device can advantageously comprise common control means for said receivers adapted to control them simultaneously in a sampled receive/dormant mode.

In one embodiment at least one of said receivers can be a superheterodyne receiver.

In a different embodiment at least one of said receivers can be a superregenerative receiver.

In accordance with the invention, said receivers can advantageously be receivers of electromagnetic waves.

In accordance with another aspect of the invention the device for receiving signals, in particular radio signals, on at least two channels characterized by different carrier frequencies for each channel comprises at least two receivers responsive to respective carrier frequencies and connected to a direct current electrical power supply between at least two respective terminals and further comprises means for regulating the voltage between said terminals of said receivers to two different predetermined operating values, one of which is lower than the other.

In accordance with a further aspect of the invention each receiver can advantageously be provided with its own means of regulating its operating voltage.

BRIEF DESCRIPTION OF THE DRAWINGS

The present invention will be more clearly understood from the following description of devices for receiving radio signals given by way of non-limiting example with reference to the appended FIGS. 1, 2 and 3.

DESCRIPTION OF THE PREFERRED EMBODIMENTS

Figure 1:
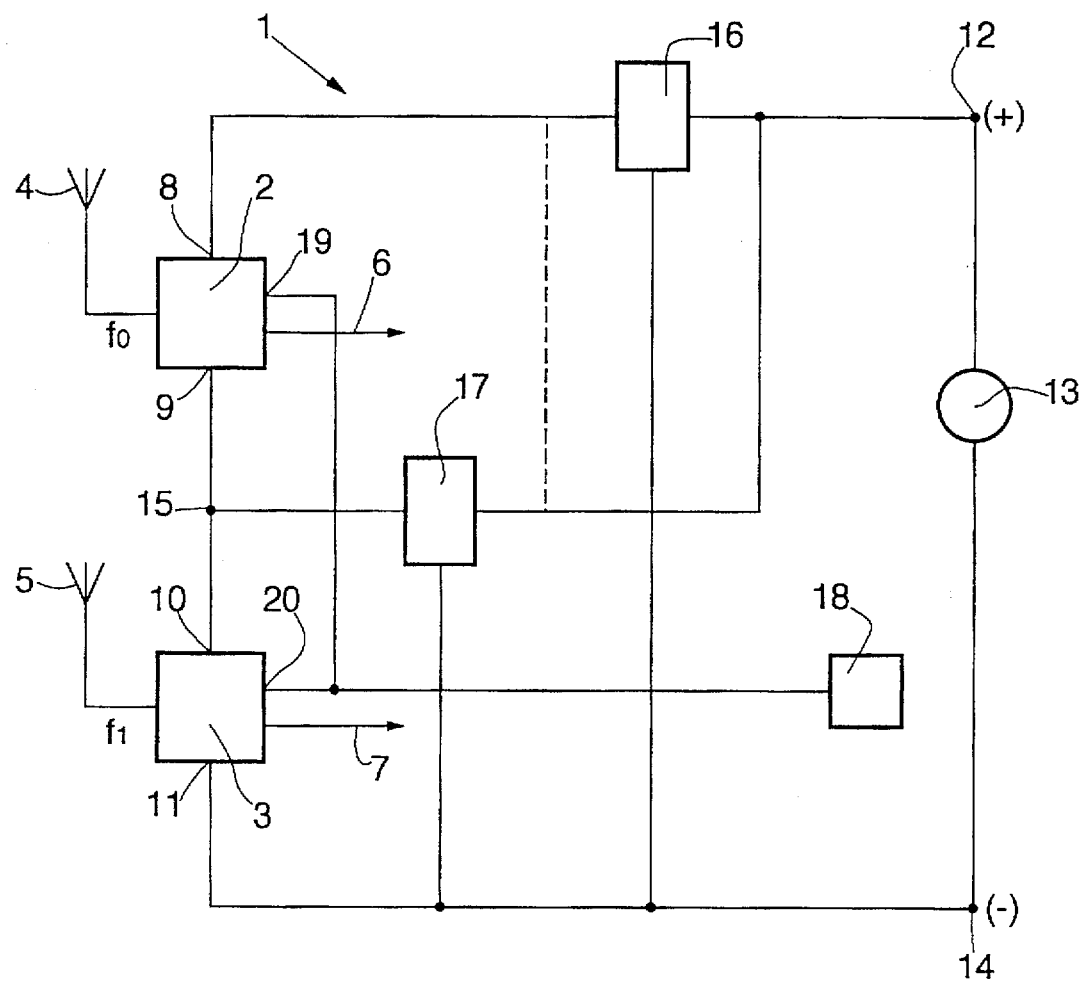
FIG. 1 shows preferred receiver device designs in accordance with the present invention.

The receiver device 1 shown in FIG. 1 comprises two radio signal receivers 2 and 3 adapted to receive separately and independently of each other radio signals picked up by respective antennas 4 and 5 on two independent channels characterized by different carrier frequencies f0 and f1 and adapted to supply the received signals or corresponding signals at their respective data outputs 6 and 7.

The receivers 2 and 3 have terminals 8, 9 and 10, 11 for connection to a direct current electrical power supply. The terminals 8 and 10 are of the same polarity. The terminals 9 and 11 are of the same polarity, that is opposite the polarity of the terminals 8 and 10.

To provide their direct current electrical power supply, the receivers 2 and 3 are connected in series between the positive (+) pole 12 of a direct current electrical power supply 13 and the ground or negative (−) pole 14 of the supply 13, this power supply being a cell or a battery, for example, or a set of cells or batteries.

In one embodiment the terminal 8 of the receiver 2 is connected no the positive (+) pole 12 of the power supply, the terminal 11 of the receiver 3 is connected to the negative (−) pole 14 of the power supply 13 and the terminals 9 and 10 of the receivers 2 and 3 are connected together to constitute a common intermediate terminal 15.

In a preferred second embodiment the higher potential terminal 8 of the receiver 2 is connected to the regulated output of a voltage regulator 16 the unregulated input of which is connected to the positive (+) pole of the power supply 13 and a reference input of which is connected to the negative (−) pole 14 of the power supply 13. The regulator 16 is adapted to maintain the voltage between the higher potential terminal 8 of the receiver 2 and the lower potential terminal 11 of the receiver 3 at a predetermined constant value U1.

The common terminal 15 between the receivers 2 and 3 is connected to the positive (+) pole 12 of the power supply 13 through a regulator 17 having a reference input connected to the negative (−) pole 14 of the power supply 13. The regulator 17 is adapted to maintain the voltage between the higher potential terminal 10 and the lower potential terminal 11 of the receiver 3 at a particular constant value U2.

provided that the voltage U0 between the poles 12 and 14 of the power supply 13 is greater than said output voltage V1 of the regulator 16 the receivers 2 and 3 are supplied with power, the voltage at the terminals 10 and 11 of the receiver 3 being substantially equal to said value U2 and the voltage between the terminals 8 and 9 of the receiver 2 being substantially equal to the difference U3 between said voltages U1 and U2. The receivers 2 and 3 then operate normally and supply at their respective outputs 6 and 7 the signals detected and picked up by their respective antennas 4 and 5.

The voltage U0 between the poles 12 and 14 of the power supply 13 decreases as the latter is discharged during use.

If the voltage U0 falls below said voltage U1, but remains above said voltage U2, the voltage between the terminals 10 and 11 of the receiver 3 remains at substantially said value U2. Accordingly, any signals available at the received signal output 7 of the receiver 3 normally represent signals picked up by the antenna 5 at frequency f1 and detected by the receiver 3.

The voltage between terminals 8 and 9 of the receiver 2 is below its normal operating voltage U3, however. As a result the receiver 2 loses at least part of its reception capability and any signals available at its signal output 6 can no longer be regarded as representing signals received by the antenna 4 at the frequency f0.

The receiver device 1 just described is of particular benefit when the signals on the frequencies f0 and f1 contain the same information to be received. The information can be received correctly and independently by the receivers 2 and 3 when the voltage U0 of the power supply 13 remains above said regulated voltage U1 and, advantageously, the information can be received correctly by the receiver 3, if the receiver 2 is no longer operating correctly, the receiver 3 being advantageously adapted to operate at a regulated voltage U2 that is relatively low in comparison with the voltage U0 of the power supply 13 when fully charged.

The receiver device 1 also has the advantage of low electrical power consumption because the receivers 2 and 3 are connected in series and the same current flows through them.

In a different implementation the common terminal 15 could be connected to the output of the voltage regulator 16 through the voltage regulator 17, as shown in dashed line in FIG. 1. The unregulated input of the voltage regulator 17 would then receive a voltage already regulated by the voltage regulator 16, so improving the stability of the voltage U2 supplied to the receiver 3.

The receiver device 1 further comprises a control circuit 18 governed by a clock for controlling the receivers 2 and 3 simultaneously in sampled receive/dormant mode via their respective inputs 19 and 20. This simultaneous receive/dormant operating mode of the receivers 2 and 3 also reduces their average power consumption and so increases the time between charging/replacing the power supply 13.

In a different embodiment the regulator 16 can be omitted, retaining only the regulator 17, if the receiver 2 incorporates its own internal regulator or can operate over a wide range of voltage. In a further embodiment each of the receiver modules or integrated circuits 2 and 3 can incorporate its own internal regulator.

Figure 2:
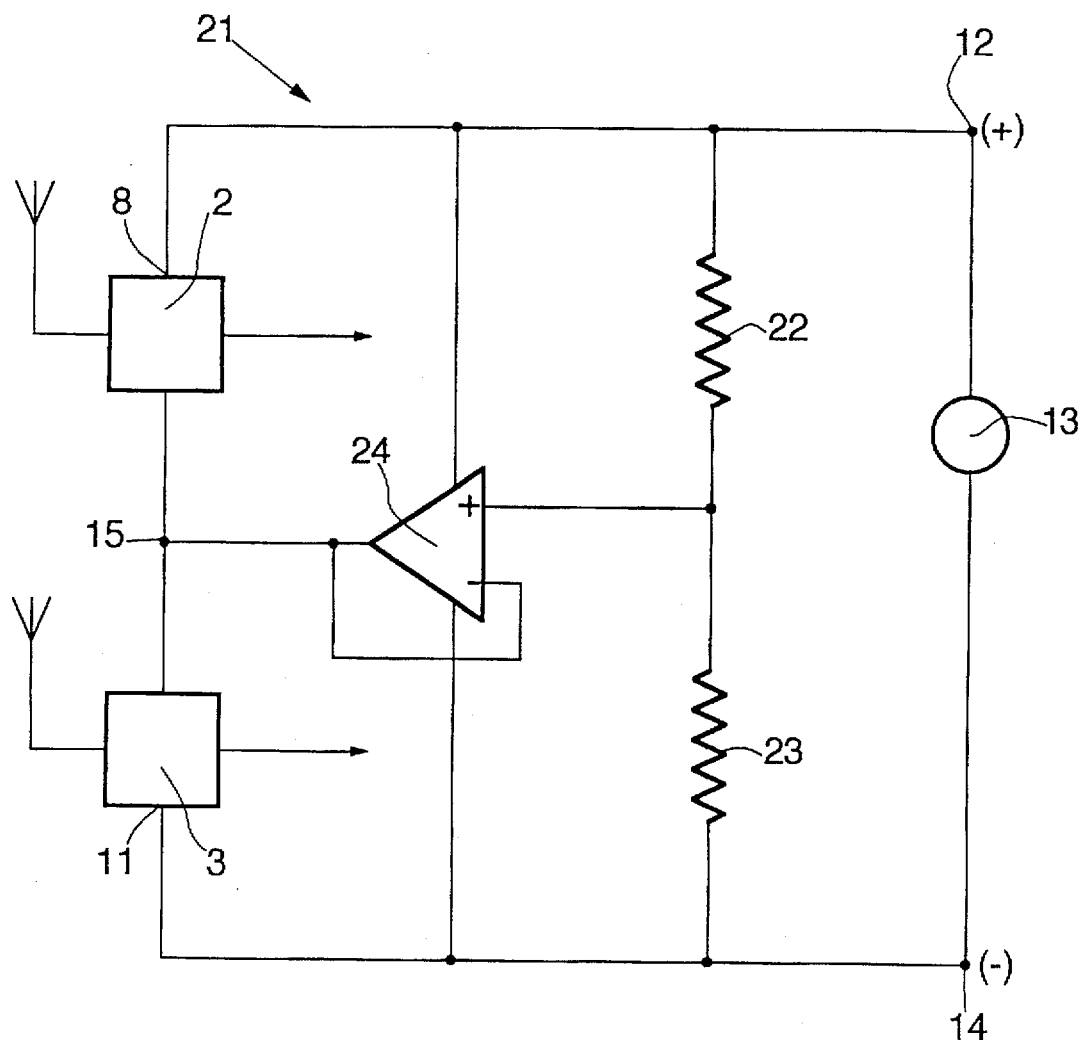
FIG. 2 shows an alternative embodiment of the receiver device incorporating a divider bridge and an operational amplifier.

In the embodiment of the device 21 for receiving radio signals shown in FIG. 2 the regulators 16 and 17 from the previous example are dispensed with. The terminals 12 and 14 of the power supply 13 are respectively connected direct to terminals 8 and 11 of the receivers 2 and 3. They are further connected to each other via a divider bridge comprising two resistors 2 and 23 in series with the common point connected to the common terminals 15 of the receivers 2 and 3 via an operational amplifier 24, so dividing the supply voltage between the receivers 2 and 3 which each incorporates internal voltage regulator means.

Figure 3:
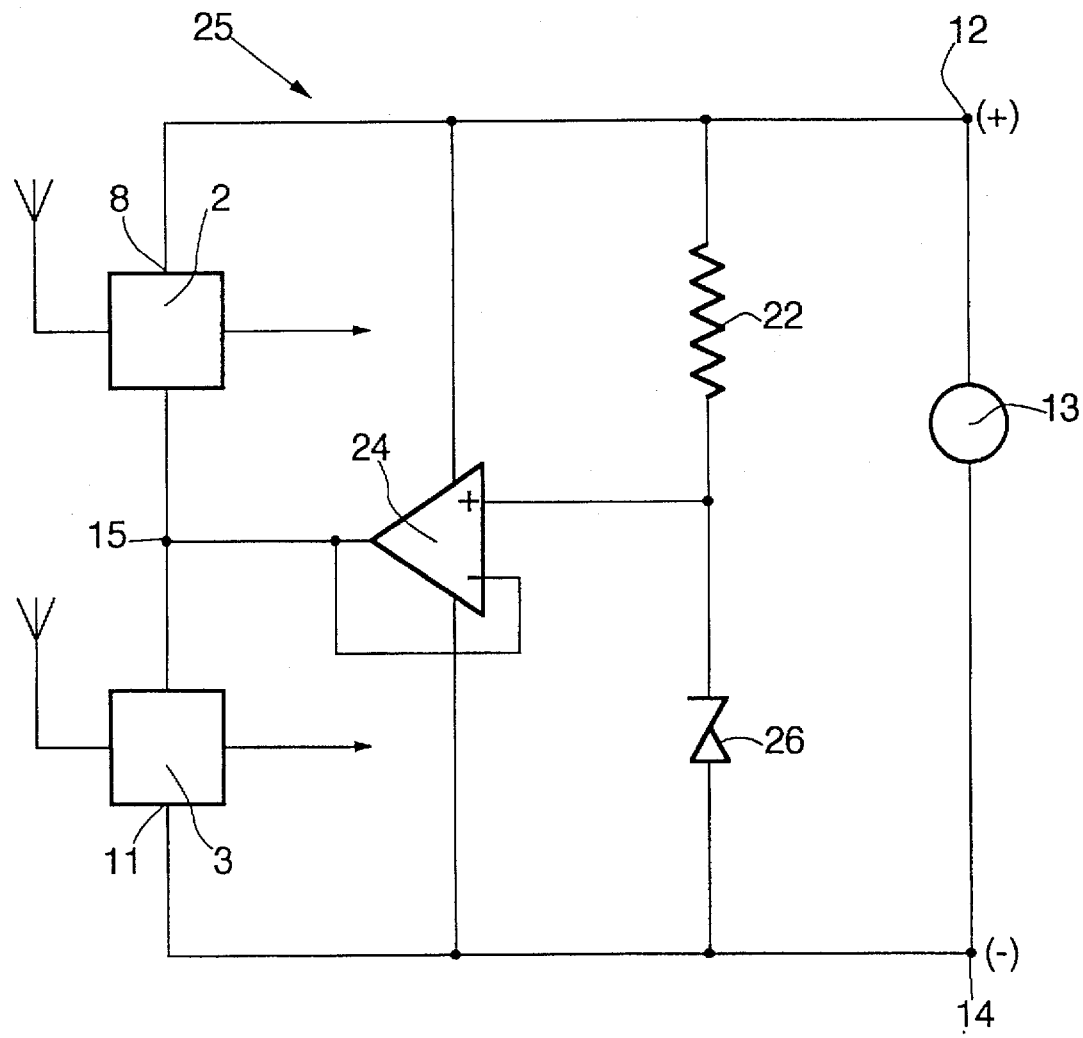
FIG. 3 shows another embodiment of the receiver device, similar to that of FIG. 2, wherein one branch of the divider bridge is replaced by a Zener diode.

In the device 25 for receiving radio signals shown in FIG. 3, which is a variant of the FIG. 2 device, one branch of said divider bridge, the resistor 23 in this example, is replaced by a stable voltage reference in the form of a Zener diode 26 so as to give precedence to the operation of one of the receivers in the event of attenuation or voltage reduction of the direct current power supply 13. In this case the branch formed by the resistor 22 can advantageously be replaced by a constant current source.

The receivers 2 and 3 can be selected from the group comprising all known receivers in the form of integrated circuits or modules. Either receiver is or both receivers are preferably of the superheterodyne or superregenerative type.

The present invention is not limited to the example described above. Many alternative embodiments are feasible without departing from the scope of the invention as defined by the appended claims.

We claim:

1. Device for receiving signals, in particular two radio signals containing a same information to be received, on two channels characterized by different carrier frequencies for each of the channels, comprising:

a direct current electrical power supply which provides a supply voltage subject to decrease;

a first receiver and a second receiver, said two receivers being responsive at a same time to different carrier frequencies, said two receivers being disposed in series between the two poles of said electrical power supply, said first receiver having a first operating voltage and said second receiver having a second operating voltage that is relatively lower than said first operating voltage, one terminal of one of said receivers being connected to one pole of said power supply, one terminal of the other receiver being connected to the other pole of said power supply and the other terminals of said receivers being connected together as common terminals; and voltage regulator means for regulating voltages between said terminals of said receivers to the respective operating voltages of said receivers when a voltage between said terminals of said electrical power supply is above said first operating voltage of said first receiver, and for regulating the voltage between said terminals of said second receiver to said second operating voltage when the voltage between said terminals of said electrical power supply decreases below said first operating voltage, whereby, when respective signals to be received by said receivers contain the same information to be received, the information is correctly receivable independently by both receivers when the voltage of said electrical power supply is above said first operating voltage and the information is correctly receivable by said second receiver having said second relatively lower operating voltage even though said first receiver having said first relatively higher operating voltage loses reception capability due to decrease in voltage between the terminals thereof to below said first operating voltage.

2. Receiver device according to claim 1 wherein the supply voltage is divided between the two receivers connected in series by means of a voltage divider bridge.

3. Receiver device according to claim 1 wherein said device comprises means for controlling the voltage at said common terminals of said receivers.

4. Receiver device according to claim 1 wherein each receiver has means for regulating its operating voltage.

5. Receiver device according to claim 1 wherein said device comprises a first voltage regulator adapted to regulate to a first predetermined value the voltage between said terminals of said receivers connected to the poles of the power supply and a second voltage regulator adapted to regulate to a second predetermined value the voltage between said common terminal of said receivers and the terminal of the receiver connected to the lower potential pole of the power supply, said first predetermined value being greater than said second predetermined value.

6. Receiver device according to claim 5 wherein said second voltage regulator is connected directly to the pole of the power supply on the input side of said first regulator.

7. Receiver device according to claim 5 wherein said second regulator is connected to the power supply through said first regulator.

8. Receiver device according to claim 1, wherein said device comprises control means common to said receivers and adapted control them simultaneously in a sampled receive/dormant mode.

9. Receiver device according to claim 1 wherein at least one of said receivers is a superheterodyne receiver.

10. Receiver device according to claim 1 wherein at least one of said receivers is a superregenerative receiver.

11. Receiver device according to claim 1 wherein said receivers are receivers of electromagnetic waves.

* * * * *